United States Patent [19]

Van Horn et al.

[11] Patent Number: 5,067,669
[45] Date of Patent: Nov. 26, 1991

[54] PORTABLE LANDING ZONE FOR HELICOPTERS

[75] Inventors: Jesse A. Van Horn, Alexandria, Ind.; Linda L. Van Horn, Yule Apts., D-30, Alexandria, Ind. 46001

[73] Assignee: Linda L. Van Horn, Alexandria, Ind.

[21] Appl. No.: 636,889

[22] Filed: Jan. 2, 1991

[51] Int. Cl.$^5$ ............................................. B64F 1/00
[52] U.S. Cl. ............................................. 244/114 R
[58] Field of Search ............... 244/114 R, 110 E, 116; 273/127 R; 114/261

[56] References Cited

U.S. PATENT DOCUMENTS

| | | | |
|---|---|---|---|
| 1,363,539 | 12/1920 | Steinmetz . | |
| 2,405,556 | 8/1946 | Bogle . | |
| 2,814,453 | 11/1957 | Trimble, Jr. et al. | 244/114 R X |
| 2,841,107 | 7/1958 | Scheider | 244/110 E X |
| 2,850,252 | 9/1958 | Ford | 244/114 R |
| 3,318,556 | 5/1967 | Vasiloff et al. | 244/114 R |
| 3,346,219 | 10/1967 | Salyer et al. | 244/114 R |
| 3,456,909 | 7/1969 | Wainwright | 244/114 R |
| 3,489,380 | 1/1970 | Vanderlip | 244/114 R |
| 3,649,724 | 3/1972 | Rembert et al. . | |
| 4,116,408 | 9/1978 | Soloy | 244/114 R |

FOREIGN PATENT DOCUMENTS 750155  1/1967  Canada ........................... 244/114 R Primary Examiner—Joseph F. Peters, Jr.
Assistant Examiner—Carla Mattix
Attorney, Agent, or Firm—Craig A. Wood

[57] ABSTRACT

A reusable landing zone transportable as equipment in an emergency vehicle and rapidly deployable by persons on the ground is disclosed for marking an area where a helicopter may safely land on an suitable surface. A plurality of bar masses are removably disposed on top of and attached near the edges of a rectangular foldable sheet using spring-closed hooks. Similarly, a bag mass is removably disposed on top of and attached near each corner of the sheet. A foldable, highly visible and reflective target is attached to the upper surface of the sheet so that the center and size of the sheet may be easily seen.

12 Claims, 2 Drawing Sheets

PORTABLE LANDING ZONE FOR HELICOPTERS

BACKGROUND OF THE INVENTION

1. Field of the Invention

The use of helicopters for the transportation of especially with respect to transportation from the scene of a disaster or accident to an emergency care center. In order for a helicopter to land safely and with minimal delay at such a scene, an airborne helicopter pilot must be able to easily discern a clearly defined area in which a landing can be made. The present invention generally relates to portable landing zones for helicopters, and more particularly concerns a portable landing zone that may be carried as equipment in an ambulance or similar emergency vehicle and rapidly deployed by persons on the ground so as to define a highly visible area in which a helicopter can land.

2. Description of the Prior Art

A number of landing structures for conventional aircraft are available, for instance, those devices disclosed by U.S. Pat. Nos. 1,363,539 and 2,405,556. In addition, landing structures for helicopters, Vertical Take Off and Landing (VTOL) and Very Short Take Off and Landing (VSTOL) aircraft are available, for instance, those devices disclosed by U. S. Pat. Nos. 3,318,556; 3,346,219; 3,456,909 and 3,649,724. These devices are primarily directed to creating a landing surface in a location where an aircraft or helicopter would not have been able to land but for the device, for instance, on a treetop or over a rough field, but also may act to mark an area where a landing may be made.

Despite the availability of such devices, there exists a need in the art for a reusable device that is directed to clearly marking an area where a helicopter may safely land on an existing surface rather than acting to create a surface upon which such a landing may be made, with such a device being lightweight, inexpensive, capable of easy and rapid deployment, and suitable of storage in and transportation by an emergency vehicle.

SUMMARY OF THE INVENTION

In order to aid in the understanding of the present invention, it can be stated in essentially summary form that it is directed to a portable landing zone for helicopters that is capable of showing to a helicopter pilot an area where a safe landing of the helicopter may be made.

It is an object of the present invention to provide a portable landing zone for helicopters that is capable of clearly marking an area where a helicopter may safely land.

It is another object of the present invention to provide a portable landing zone for helicopters that is capable of transportation by and storage in an emergency vehicle.

It is another object of the present invention to provide a portable landing zone for helicopters that is capable of easy and rapid deployment.

It is another object of the present invention to provide a portable landing zone for helicopters that is capable of easy and rapid restorage.

It is another object of the present invention to provide a portable landing zone for helicopters that is lightweight yet sturdy.

It is still another object of the present invention to provide a portable landing zone for helicopters that is inexpensive to produce.

It is yet another object of the present invention to provide a portable landing zone for helicopters of relatively simple construction with a minimum of components.

Further objects and advantages of the present invention will be apparent from a study of the following portion of the specification, the claims, and the attached drawings.

DESCRIPTION OF THE PREFERRED EMBODIMENT

The following portion of the specification, taken in conjunction with the drawings, sets forth the preferred embodiment of the present invention. The embodiment of the invention disclosed herein is the best mode contemplated by the inventors for carrying out their invention in a commercial environment, although it should be understood that various modifications can be accomplished within the parameters of the present invention.

Figure 1:
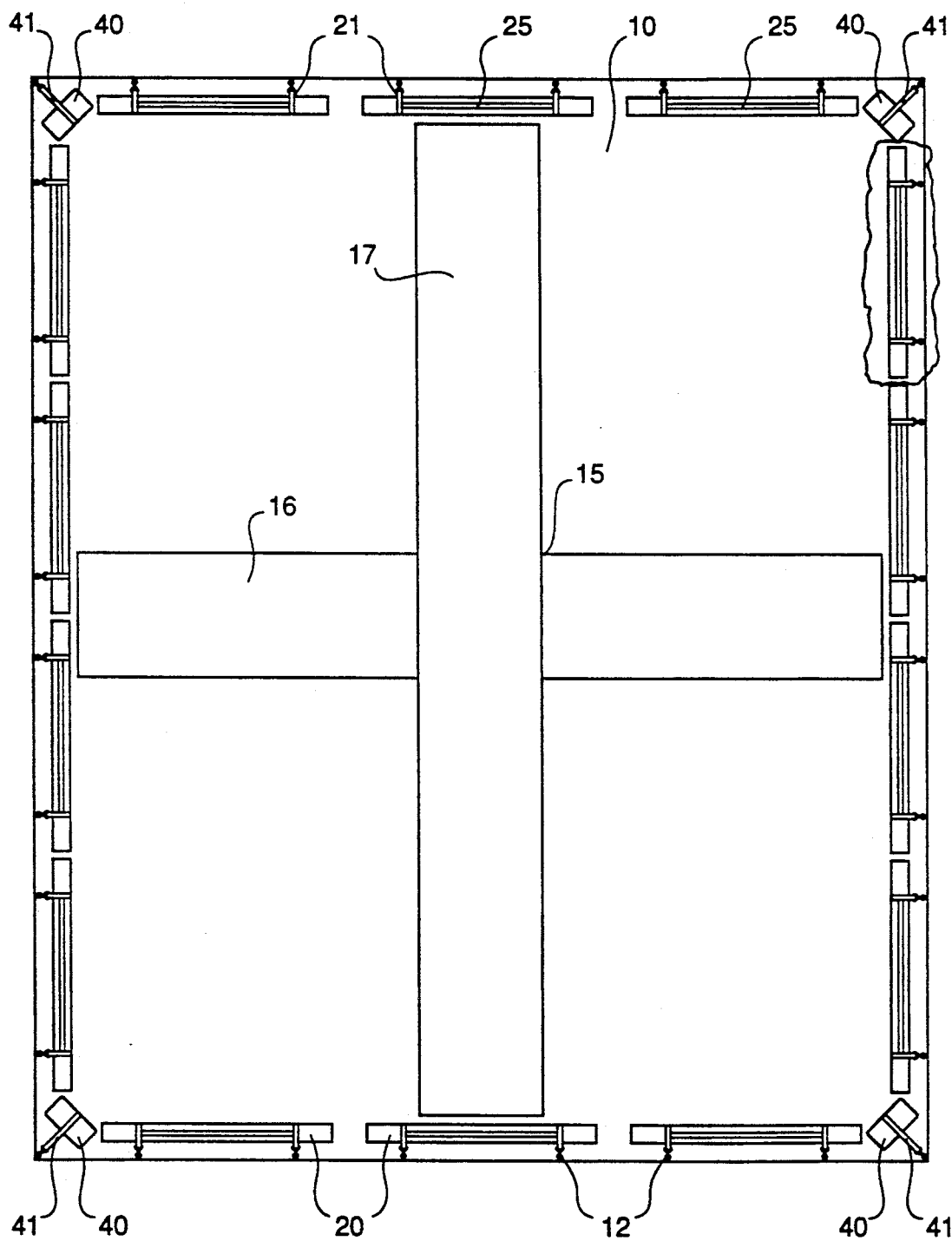
FIG. 1 is a plan view of a portable landing zone for helicopters representing the present invention in a state of deployment.
Figure 3:
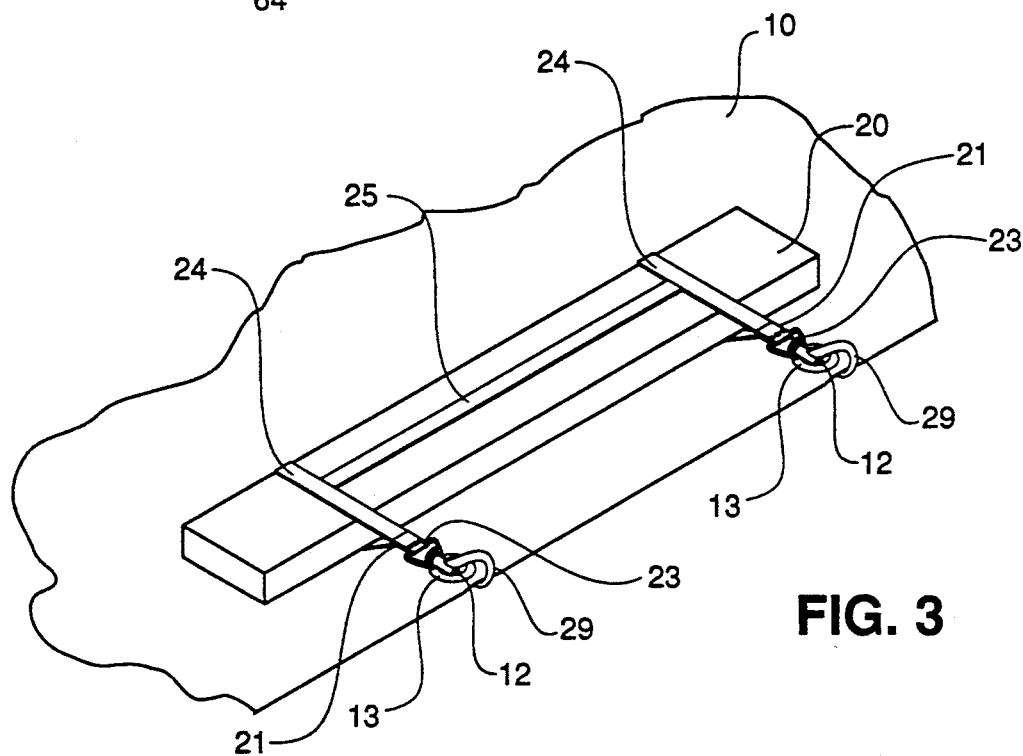
FIG. 3 is an enlarged, fragmentary perspective view of bar mass 20 as attached to sheet 10, as indicated in FIG. 1.

Referring now to the drawings for a detailed description of the present invention, reference is first made to FIGS. 1 and 3, showing generally rectangular flexible sheet 10 having a plurality of holes 12, disposed along the edges and near each corner of sheet 10. Sheet 10 may be constructed of a resilient, tear and puncture resistant material such as polyethelyne or canvas. Grommets 13 are disposed inside holes 12. Flexible sheet target 15, having shorter strip 16 and longer strip 17, is attached to the upper surface of sheet 10, for instance by sewing or lamination, so that shorter strip 16 perpendicularly bisects the longer sides of sheet 10 and longer strip 17 perpendicularly bisects the shorter sides of sheet 10. The color and reflectivity of target 15 may be chosen so that target 15 is highly visible and contrasts greatly with respect to the color and reflectivity of sheet 10. In this way, the center of sheet 10 may be easily determined from a great distance from sheet 10. Bar masses 20 are removably disposed in contact with the upper surface of sheet 10, proximate to and generally parallel with the edges of sheet 10, so that holes 12 are disposed between bar masses 20 and the proximate edge of sheet 10. Bar masses 20 may be constructed of a dense, rigid material such as steel. Two flexible bar straps 21, each having a bar hook attachment end 23 and a bar loop end 24, are disposed with bar loop end 24 encircling and in a plane normal to the axis of each bar mass 20. The inner perimeter of bar loop ends 24 is chosen to be slightly greater than the smallest perimeter of bar masses 20, so that each bar loop end 24 may be placed in position encircling a bar mass 20 by sliding each bar loop end 24 along the axis of a bar mass 20, while maintaining a relatively tight fit of bar loop end 24 with respect to bar mass 20. A cross strap 25 is disposed parallel to the axis of each bar mass 20 and attached, for instance by sewing, to and between the two bar straps 21 encircling each bar mass 20. The orientation of bar straps 21 and cross straps 25 on each bar mass 20 may be additionally maintained by attaching bar straps 21 and cross straps 25 to bar masses 20, for example, by using resilient tape, not shown, wrapped around bar masses 20, bar straps 21 and cross straps 25. Attached to each bar hook attachment end 23 is a spring-closed bar hook 29. Bar masses 20 may be removably attached to sheet 10 by connection of each bar hook 29 through a hole 12 and a grommet 13. It is seen that the spacing of holes 12 is chosen so as to correspond to the spacing between bar straps on bar masses 20, as determined by the length of cross straps 25, and to correspond to the spacing between bar masses 20.

Figure 2:
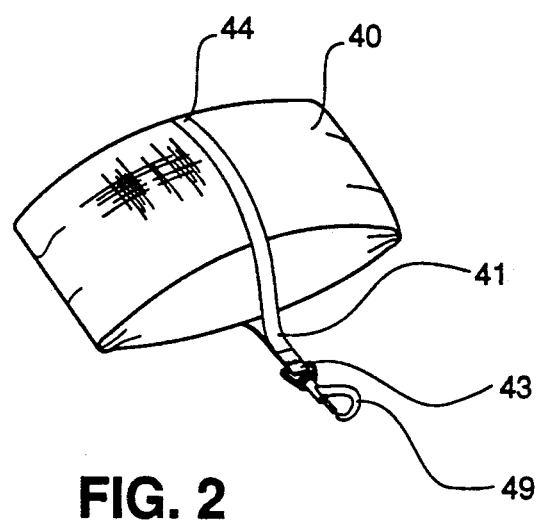
FIG. 2 is a perspective view of carrying case 60.

Referring to FIGS. 1 and 2, four bag masses 40 are removably disposed in contact with the upper surface of sheet 10, and each bag mass 40 is proximate to a corner of sheet 10 that the hole 12 near each corner of sheet 10 is disposed between a bag mass 40 and the proximate corner of sheet 10. Bag masses 40 may be constructed of a resilient and puncture resistant material such as leather or vinyl, sewn so as to form a bag, and filled with a dense, granular substance such as sand. A flexible bag strap 41, having a bag hook attachment end 43 and a bag loop end 44, is disposed with bag loop end 44 encircling each bag mass 40. The inner perimeter of bag loop ends 44 is chosen to be slightly greater than the encircled perimeter of bag masses 40, so that each bag loop end 44 may be placed in position encircling a bag mass 40 by sliding each bag mass 40 through a bag loop end 44, while maintaining a relatively tight fit of bag loop end 44 with respect to bag mass 40. The orientation of bag straps 41 on bag masses 40 may be additionally maintained by attaching bag straps 41 to bag masses 40, for example, by sewing bag straps 41 to bag masses 40. Attached to each bag hook attachment end 43 is a spring-closed bag hook 49. Bag masses 40 may be removably attached to sheet 10 by connection of each bag hook 42 through a hole 12 and a grommet 13 proximate to a corner of sheet 10.

Figure 4:
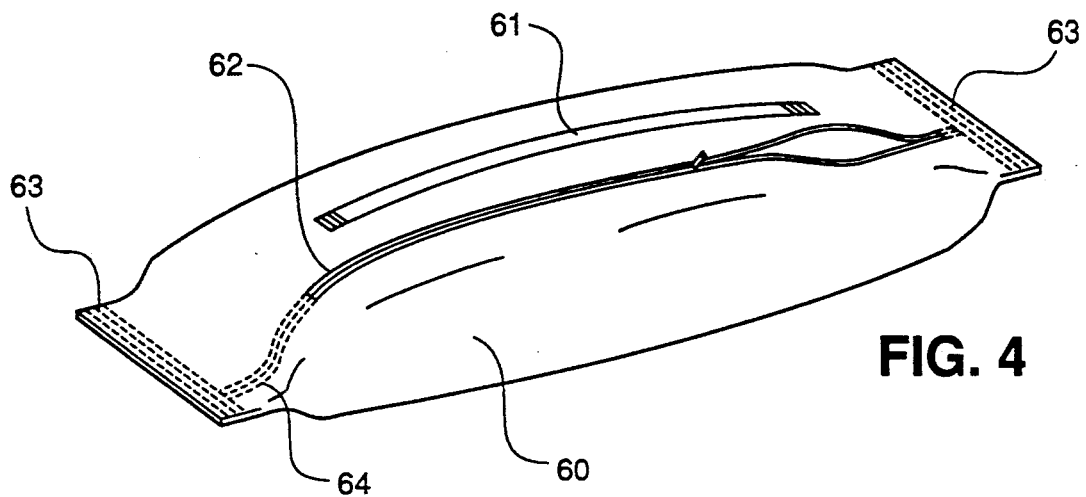
FIG. 4 is an enlarged, perspective view of bag mass 40.

FIG. 4 depicts generally rectangular carrying case 60, having carrying strap 61 and zipper 62. Carrying case 60 may be constructed of a resilient, puncture and tear resistant material that is capable of being sewn, such as heavy canvas, thereby permitting carrying case 60 to be fabricated from a single piece of such material by sewing at ends 63 and edge 64, and permitting carrying strap 61 and zipper 62 to be easily attached to carrying case 60 by sewing. The axial dimension of carrying case 60 is chosen so that bar masses 20 may be removably placed inside carrying case 60, disposed with the axis of each bar mass 20 parallel to the axis of carrying case 60. The other dimensions of carrying case 60 are chosen so that a suitable number of bar masses 20 may be placed in carrying case 60, determined by the weight of each bar mass 20. Typically, the total weight of all bar masses 20 to be placed in carrying case 60 should be less than approximately one hundred pounds.

The dimensions of sheet 10 may be chosen to be large enough so as to permit the pilot of a helicopter to easily discern the location of the present invention on the ground from a considerable distance. In addition, the dimensions of sheet 10 may be chosen so that the diameter of the circle swept out by the helicopter's rotor blades is less than the length of shorter strip 16, thereby assuring the helicopter pilot that the rotor blades will not come into contact with any object or person during landing provided a landing is made at the center of target 15. On the other hand, the dimensions of sheet 10 may be chosen to be small enough so as to permit sheet 10 to be folded to occupy a relatively small volume, and so as to require a relatively small number of bar masses 20. In this way, the overall mass and volume of the present invention may be minimized, thereby increasing the number of ways in which the present invention may be transported. As a balance between these competing size interests, typical dimensions of sheet 10 are approximately twenty feet by sixteen feet, with the length of shorter strip 16 approximately fourteen feet. Similarly, the mass of each bar mass 20 may be chosen so that a minimum number of bar masses are required, but each bar mass may be easily handled. For a material such as steel, a typical weight for each bar mass 20 is approximately thirteen pounds, with an axial length of four feet. The present invention, as shown in FIG. 1, illustrates the preceeding approximate dimensions, where four bar masses 20 are utilized along each longer side of sheet 10 and three bar masses 20 are placed along each shorter side of sheet 10. The weight of each bag mass 40 is typically twenty pounds, so that the total weight of all bar masses 20 and bag masses 40 as depicted in FIG. 1 is approximately two hundred sixty pounds.

When not deployed, the present invention may be stored and carried in an emergency or other vehicle. In this configuration, sheet 10 may be folded so as to occupy a small volume, bar masses 20 with bar straps 21, cross straps 25 and bar hooks 29 attached may be disposed within carrying cases 60, and bag masses 40 with bag straps 41 and bag hooks 49 attached may be stowed in any convenient place. When the present invention is to be deployed, sheet 10 may be unfolded and spread out over a suitable surface, and bag masses 40 may be separately carried to sheet 10 and positioned at each corner and attached to sheet 10 using bag hooks 49. Carrying cases 60 may be carried from the vehicle to the location of sheet 10, bar masses 20 removed from carrying cases 60 and placed on the upper surface of sheet 10 and attached to sheet 10 as previously described. After use, bar masses 20 may be disconnected from sheet 10 and placed in carrying cases 60, bag masses 40 disconnected from sheet 10, and sheet 10 refolded, making the present invention ready for storage.

The present invention having been described in its preferred embodiment, it is clear that it is susceptible to numerous modifications and embodiments within the ability of those skilled in the art and without the exercise of the inventive faculty. Accordingly, the scope of the present invention is defined by the scope of the following claims.

What is claimed is:

1. Portable helicopter landing zone, comprising:
   a generally rectangular flexible sheet having an upper surface;
   a flexible sheet target;
   means for attaching said sheet target to said upper surface;
   a plurality of bar masses;
   four bag masses;
   means for removably attaching said bar masses to said sheet so that said bar masses are disposed in contact with said upper surface and proximate to and generally parallel with the edges of said sheet; and
   means for removably attaching said bag masses to said sheet so that said bag masses are disposed in contact with said upper surface and one of said bag masses is disposed proximate to each corner of said sheet.

2. Portable helicopter landing zone as defined in claim 1, wherein said sheet target comprises:
a first flexible strip of length substantially equivalent to the length of the longer side of said sheet disposed perpendicularly to and bisecting the shorter sides of said sheet; and,
a second flexible strip of length substantially equivalent to the length of the shorter side of said sheet disposed perpendicularly to and bisecting the longer sides of said sheet.

3. Portable helicopter landing zone as defined in claim 1, wherein:
said sheet has a plurality of edge holes disposed proximate to the edges of and through said sheet;
said means for attaching said bar masses to said sheet comprises
a plurality of bar straps, each having a bar hook attachment end and a bar loop end, with each of said bar loop ends disposed around and in a plane normal to the axis of one of said bar masses,
a plurality of cross straps, each aligned parallel to the axis of, adjacent to, and attached between each of said bar loop ends disposed around one of said bar masses, and
a plurality of bar hooks, each attached to one of said bar hook attachment ends and removably attachable through one of said edge holes.

4. Portable helicopter landing zone as defined in claim 3, wherein said sheet target comprises:
a first flexible strip of length substantially equivalent to the length of the longer side of said sheet disposed perpendicularly to and bisecting the shorter sides of said sheet; and,
a second flexible strip of length substantially equivalent to the length of the shorter side of said sheet disposed perpendicularly to and bisecting the longer sides of said sheet.

5. Portable helicopter landing zone as defined in claim 4, further comprising a carrying case having interior dimensions greater than the exterior dimensions of a plurality of said bar masses.

6. Portable helicopter landing zone as defined in claim 5, wherein each of said bar masses comprises a straight bar having rectangular cross-section.

7. Portable helicopter landing zone as defined in claim 1, wherein:
said sheet has four corner holes disposed through said sheet so that one of said corner holes is proximate to each of the corners of said sheet;
said means for attaching said bag masses to said sheet comprises
four bag straps, each having a bag hook attachment end and a bag loop end, with each of said bag loop ends disposed around one of said bag masses, and
four hooks, each attached to one of said bag hook attachment ends and removably attachable through one of said corner holes.

8. Portable helicopter landing zone as defined in claim 7, wherein said sheet target comprises:
a first flexible strip of length substantially equivalent to the length of the longer side of said sheet disposed perpendicularly to and bisecting the shorter sides of said sheet; and,
a second flexible strip of length substantially equivalent to the length of the shorter side of said sheet disposed perpendicularly to and bisecting the longer sides of said sheet.

9. Portable helicopter landing zone as defined in claim 1, wherein:
said sheet has a plurality of edge holes, disposed proximate to the edges of and through said sheet, and four corner holes, disposed through said sheet so that one of said corner holes is proximate to each of the corners of said sheet;
said means for attaching said bar masses to said sheet comprises
a plurality of bar straps, each having a bar hook attachment end and a bar loop end, with each of said bar loop ends disposed around and in a plane normal to the axis of one of said bar masses,
a plurality of cross straps, each aligned parallel to the axis of, adjacent to, and attached between each of said bar loop ends disposed around one of said bar masses,
a plurality of bar hooks, each attached to one of said bar hook attachment ends and removable attachable through one of said edge holes; and
said means for attaching said bag masses to said sheet comprises
four bag straps, each having a bag hook attachment end and a bag loop end, with each of said bag loop ends disposed around one of said bag masses,
four hooks, each attached to one of said bag hook attachment ends and removably attachable through one of said corner holes.

10. Portable helicopter landing zone as defined in claim 9, wherein said sheet target comprises:
a first flexible strip of length substantially equivalent to the length of the longer side of said sheet disposed perpendicularly to and bisecting the shorter sides of said sheet; and,
a second flexible strip of length substantially equivalent to the length of the shorter side of said sheet disposed perpendicularly to and bisecting the longer sides of said sheet.

11. Portable helicopter landing zone as defined in claim 10, further comprising a carrying case having interior dimensions greater than the exterior dimensions of a plurality of said bar masses.

12. Portable helicopter landing zone as defined in claim 11, wherein each of said bar masses comprises a straight bar having rectangular cross-section.

* * * * *